(12) United States Patent
Wiles

(10) Patent No.: US 8,818,864 B2
(45) Date of Patent: *Aug. 26, 2014

(54) INTEGRATED DIGITAL BROADCASTING SYSTEM, NETWORK, AND METHODS

(71) Applicant: Brian C. Wiles, Cameron Park, CA (US)

(72) Inventor: Brian C. Wiles, Cameron Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/950,291

(22) Filed: Jul. 25, 2013

(65) Prior Publication Data

US 2013/0312030 A1 Nov. 21, 2013

Related U.S. Application Data

(63) Continuation of application No. 13/105,834, filed on May 11, 2011, now Pat. No. 8,527,351.

(51) Int. Cl.
*G06Q 30/00* (2012.01)
*G06Q 30/02* (2012.01)

(52) U.S. Cl.
CPC ........ *G06Q 30/0273* (2013.01); *G06Q 30/0249* (2013.01); *G06Q 30/0251* (2013.01); *G06Q 30/0246* (2013.01)

USPC .................. 705/14.69; 705/14.48; 705/14.49; 705/14.45

(58) Field of Classification Search
USPC ....................................................... 705/14.69
See application file for complete search history.

(56) References Cited

U.S. PATENT DOCUMENTS

| | | | |
|---|---|---|---|
| 6,772,209 B1* | 8/2004 | Chernock et al. | 709/225 |
| 7,873,541 B1* | 1/2011 | Klar et al. | 705/20 |
| 2004/0057412 A1* | 3/2004 | Curcio et al. | 370/341 |
| 2009/0150215 A1* | 6/2009 | Kalb et al. | 705/10 |
| 2010/0210331 A1* | 8/2010 | Hughes et al. | 463/4 |

* cited by examiner

*Primary Examiner* — John G Weiss
*Assistant Examiner* — Scott C Anderson

(57) ABSTRACT

An integrated system, network, and method for providing audio/video broadcasting of programming and advertising content. The system provides sales, traffic, playback automation, and accounting services to a media outlet. The network links multiple integrated systems together between multiple media outlets and advertising clients. The network also provides distribution of programming and advertising content to multiple media outlets simultaneously.

5 Claims, 4 Drawing Sheets

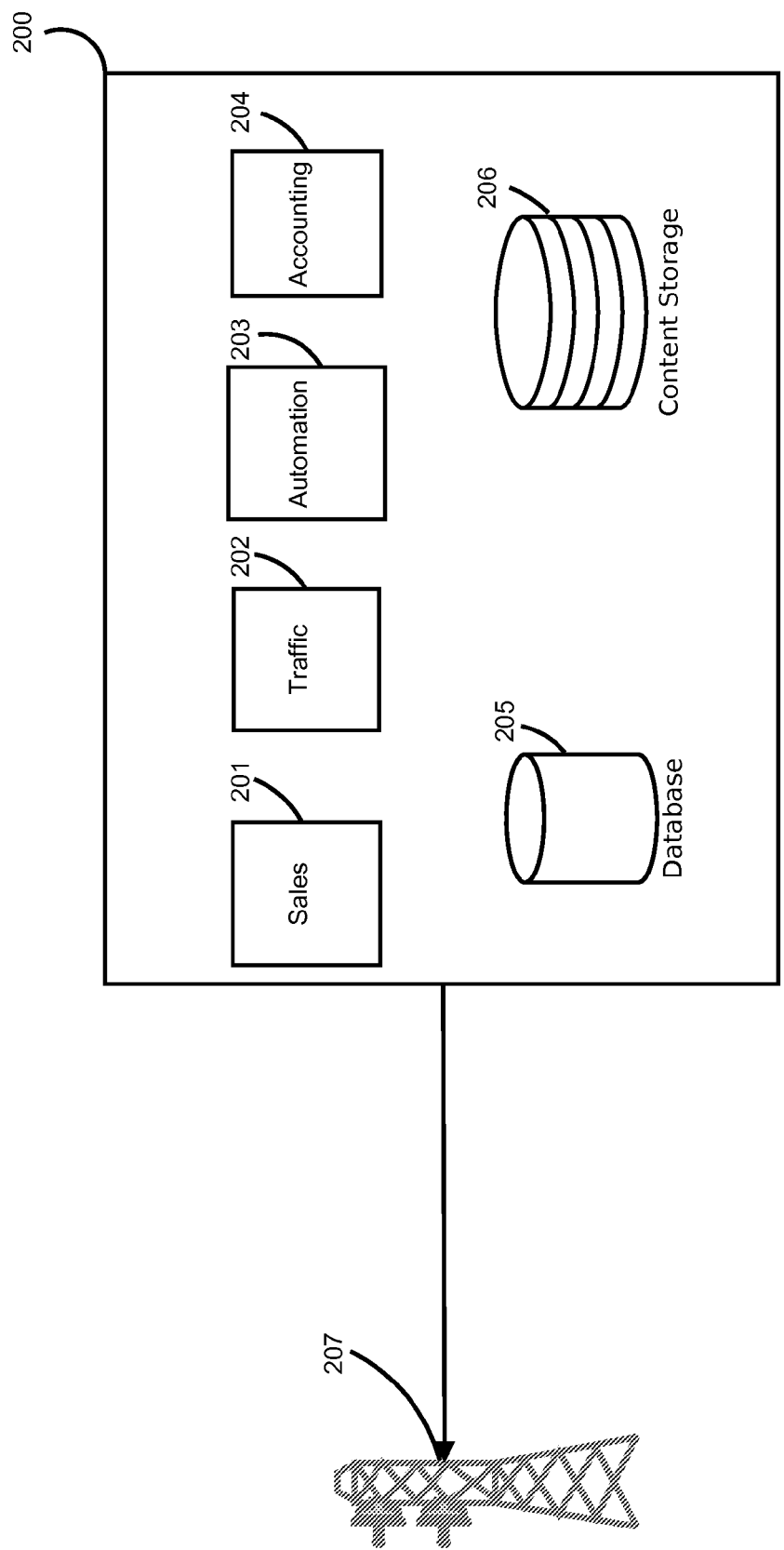

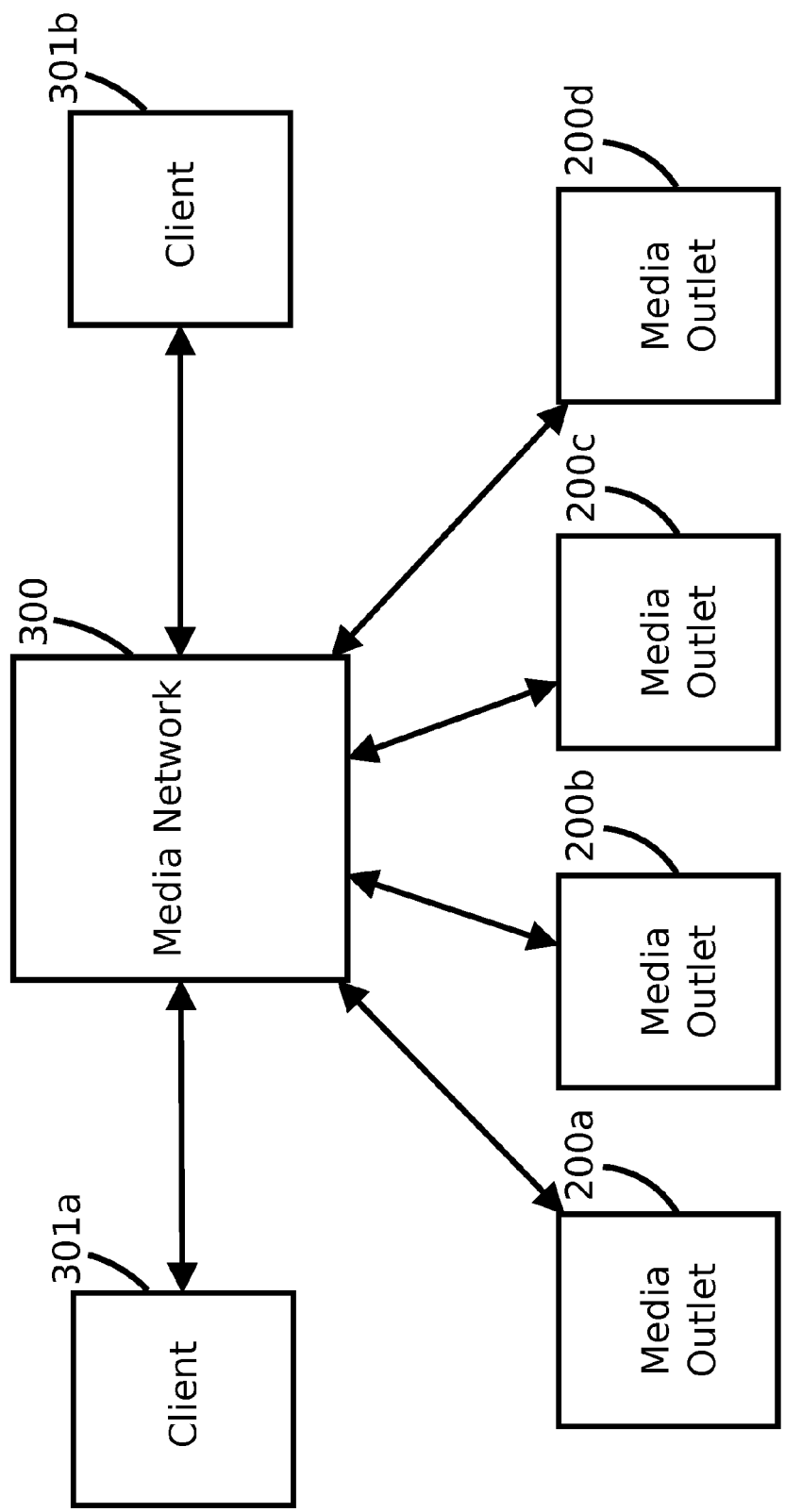

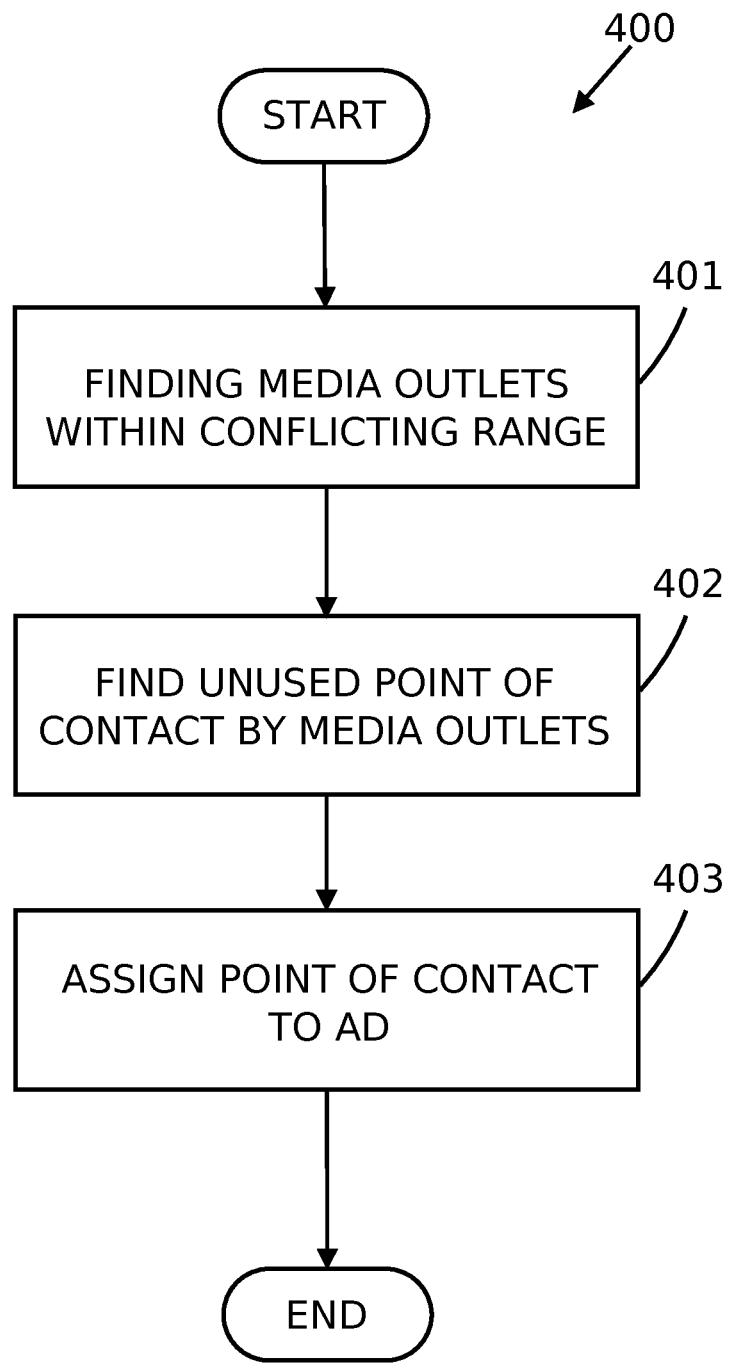

INTEGRATED DIGITAL BROADCASTING SYSTEM, NETWORK, AND METHODS

CROSS-REFERENCE TO RELATED APPLICATIONS

This application is a continuation of U.S. application Ser. No. 13/105,834, filed May 11, 2011. The patent application identified above is incorporated herein by reference in its entirety to provide continuity of disclosure.

FIELD OF THE INVENTION

The present invention relates to broadcasting media over several technology platforms such as traditional radio and television air waves, the Internet, and mobile telephones. More particularly, the present invention relates to an integrated system and methods that broadcast media across all platforms as well as a network to connect said integrated system between media outlets.

BACKGROUND OF THE INVENTION

Traditional broadcast media companies have continued to use the same technologies and systems to broadcast television and radio programming to viewers for decades. New technologies such as the Internet and mobile telephones have allowed new companies to deliver programming content to their viewers more efficiently and allows them to sell advertising in new ways based upon new metrics such as demographics. Not only have these new technologies created new media outlets that are cheaper to utilize, but these new companies have also created efficient systems to deliver content without being constrained by the limitations faced by traditional broadcast media companies.

Recently, traditional broadcast media companies have made the transition from analog broadcasting to digital broadcasting and High Definition Television (HDTV). Now, traditional television stations are almost completely digital. Radio stations are mostly digital as well but still broadcast over analog radio waves. From a technology perspective, both types of media outlets can now be integrated with other outlets such as the Internet and mobile phones since they use the same video and audio file formats, for example MPEG-2 for video and MP3 for audio.

Advertising sales methods vary by media outlet and are more advanced on new technology platforms such as the Internet and mobile telephones. There is a huge gap in the sales capabilities between these new media outlets and traditional media outlets. For example, Internet advertising can sell different types of advertisements based upon several metrics such as content keywords, audience demographics, and number of viewers. However, traditional media outlets can only sell advertising based upon generic factors such as time of day, and are limited to showing one type of advertisement, namely video or audio advertisements that last a certain number of seconds during a programming break.

Another major dilemma facing traditional media broadcasters is the fact that no single product handles the entire process from sales to the final broadcast. Currently, several different vendors and products are designed to handle a specific piece of the work flow. For example, a typical station might use MediaOcean by Donovan Data Systems for sales, OSi-Traffic by Optimal Solutions, Inc. for scheduling, and ADC by Harris Corporation for playback automation and broadcasting. Station operators then have to export data in different formats from one piece of software to the next. This process is often error-prone due to differences in how each software application interprets the data. Some industry standards have been created for this purpose, but vendors don't often implement a standard the same way as other vendors.

It is common for audio and video standards to evolve quickly. As the standards change, the stations must purchase expensive modules to take advantage of the changes. The cost is further increased due to the need to purchase modules for each piece of software along the chain. This is an inconvenience to the station and is often cost-prohibitive to implement with modules often costing tens of thousands of dollars or more each. It is for this reason that not all stations can even take advantage of the latest technologies.

A major side effect of separate systems is that traditional media broadcasters aren't able to guarantee that an advertisement will appear when it is scheduled. Also, if an advertisement is not shown, the automation system typically does not have a way of communicating with the sales or accounting system to credit the advertiser or give the option of rescheduling the advertisement. The end result is that the station sells its inventory on a "best effort" basis and based on average success rates rather than accurate results.

Another side effect of separate systems is that broadcasters can only sell advertising and schedule programming 24 hours in advance. At the end of a typical work day, the schedule for the next day is finalized and exported to the automation system. There is no way to sell a last-minute advertising spot that might not have been sold before the scheduling deadline. As a result, stations miss potential revenue that could be made if they could sell more advertising.

The use of Digital Video Recorders (DVR's) has also contributed to the fall in revenue for stations. DVR's allow viewers to skip commercial advertisements with the touch of a button, and some are able to detect them and remove them from the recorded program automatically. Advertisers are looking to alternative media outlets such as the Internet to reach more viewers as well.

Another factor contributing to high operational costs is the lack of accounting systems that are designed for the broadcast business model. Media broadcasters are forced to use inadequate accounting features of sales and scheduling packages which do not support advanced billing and invoicing functionality. For example, in order to bill a client for anything other than a television commercial, a station operator must create a dummy commercial 1-second long and use that to invoice the client the proper amount. In the alternative, third-party accounting packages are used which have to be heavily customized to support a station's business model, and data has to be exported on a one-way basis from the station's operations systems into the accounting system.

The end result is that as other media outlets and technologies evolve, traditional media broadcasters are falling farther and farther behind due to the large expense in updating systems and the lack of integration between systems.

BRIEF DESCRIPTION OF THE DRAWINGS

Various embodiments are described with reference to the following drawings, wherein:

FIG. 2 is a simplified block diagram illustrating the present invention in use at a television or radio station;

FIG. 3 is a simplified block diagram illustrating communications between a media network, multiple advertising clients, and multiple media outlets; and FIG. 4 is a flow diagram illustrating a method for allocating unique contact information to an ad.

DETAILED DESCRIPTION OF THE INVENTION

1. Purpose

Figure 1:
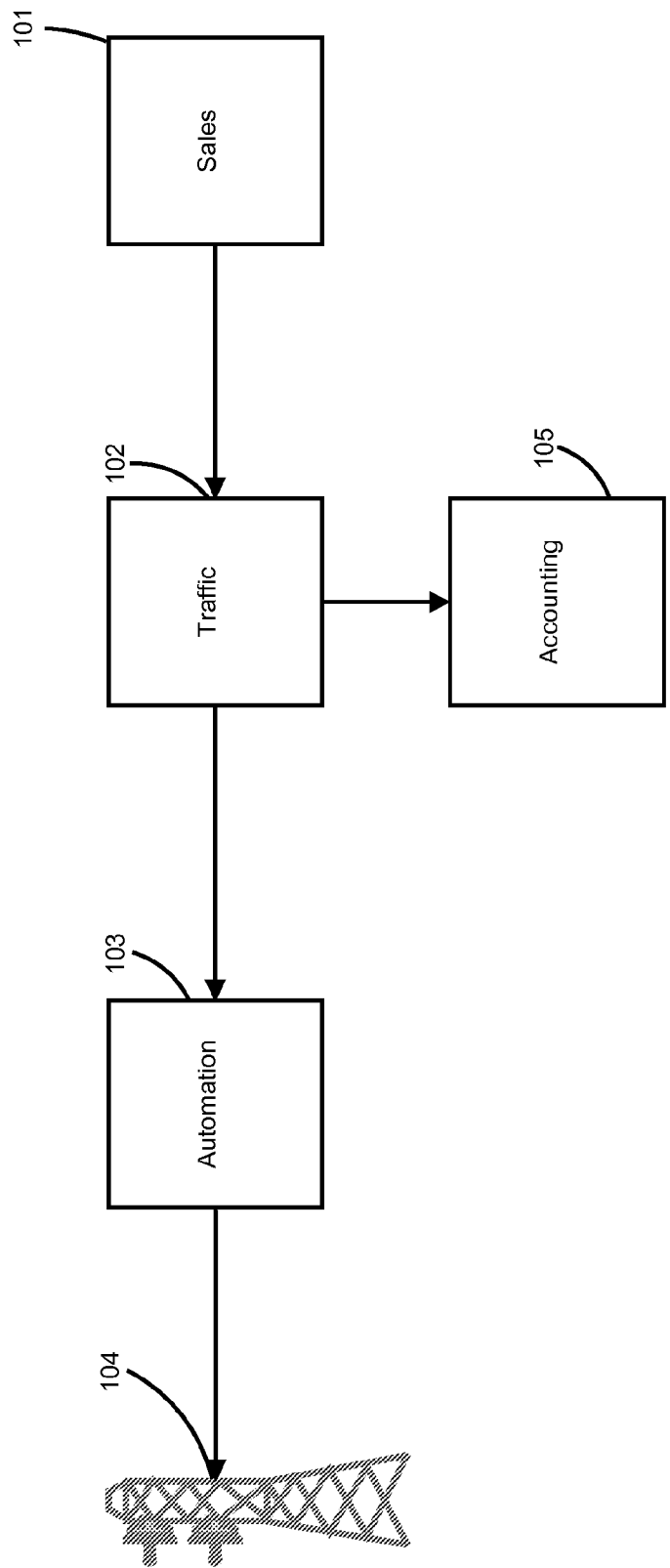
FIG. 1 is a simplified block diagram illustrating an exemplary set of systems in use at a television or radio station.

There are 2 purposes of the present invention. First, the present invention aims to serve as an integrated system that replaces a plurality of separate systems, both within a media company as well as the systems across media companies, advertisers, and advertising agencies thereby lowering the operational costs of those same media companies, advertisers, and agencies. Second, the present invention aims to increase revenue potential for media companies by offering new types of advertising as well as integration with other media outlets such as Internet web sites, mobile phones, and digital billboards displayed along streets and highways.

The following is a description of the preferred embodiment of the invention. However, several variations of embodiment are possible due to the flexibility digital technology offers. Nothing in this description is meant to limit the scope of the invention to one implementation or to otherwise limit the flexibility of the invention. Furthermore, several components that are commonly known to those skilled in the art have not been included in the drawings or description of the present disclosure as their inclusion would not enhance the understanding of the present invention. The exclusion of these components is not to be understood as a limitation upon the present invention.

2. Definition of Terms

In the present disclosure, multiple terms are used, some industry-specific, and others are new concepts introduced with the invention. The following terms are used in the present disclosure:

Ad—An advertisement which can take any form such as a television commercial, a radio commercial, a clickable banner graphic on a web site, or an image on a billboard.

Ad-ID—An alphanumeric identifier assigned by the American Association of Advertising Agencies (4A's) and the Association of National Advertisers, Inc. (ANA). It is designed to uniquely identify an ad between entities such as clients and stations. It is an extension of the ISCI code. An Ad-ID is typically 12 characters in length.

Automation—Also called "playback automation", this term refers to the actual playing of audio/video clips in sequence as well as the switching between different sources of programming such as live feeds.

Avail—Short for "available inventory", this term is used to indicate an ad unit that has not been sold and is available for purchase by an advertiser. It takes the form of the desired media outlet and can vary within an outlet. For example, a 30-second television spot, or a banner ad rotation on a web site.

Broadcast Day—The time between station sign-on and sign-off. Even though most stations broadcast 24 hours per day, broadcast days still usually start between 5:00 am-7:00 am rather than midnight.

Broadcast Week—A broadcast week begins on Monday and ends on Sunday as opposed to a calendar week which begins on Sunday.

Client—A client can be either an advertiser or an advertising agency contracted to buy media on the advertiser's behalf. For purposes of the present invention, there is no need to distinguish between either type of entity.

Day Part—A period of time during a broadcast day such as daytime, prime time, or late night.

Frequency—The number of times an ad is to be shown during a broadcast week.

Inquiry—An action made by a customer in response to viewing an ad. Examples include calling a toll-free telephone number to get information about a product and placing an order for the product.

ISCI Code—Short for Industry Standard Commercial Identifier, this code is an alphanumeric identifier for referencing an ad between entities similar to its replacement Ad-ID. An ISCI code is usually 8 characters in length.

Log—A list of the scheduled items for a broadcast day. The log is used by automation system to determine when to play each item.

Make Good—A make good is an ad shown for free to compensate an advertiser for an ad that did not appear as scheduled.

Per Inquiry—Also called "PI", an arrangement where the advertiser agrees to pay the station a specified amount multiplied by the number of inquiries made in response to the ad.

Rate—The amount to charge each time an ad is shown.

Snipe—An animated advertisement overlaid onto a television program or other video clip that does not interrupt the program. Also called a bug.

Traffic—The scheduling of programs and commercials during a broadcast day. A traffic department at a station works with the sales department to ensure that sales representatives are kept up-to-date on available inventory to ensure sales contracts can be honored as much as possible.

3. Current Systems

FIG. 1 is a simplified block diagram illustrating an exemplary set of systems in use at a television or radio station. Due to the lack of one completely integrated system, several manual processes are involved in a station's daily operations. For example, a client such as an advertiser must fax a sales order to the sales representative at the station rather than entering the order electronically. A significant portion of a station's overhead costs results from the processing and storage of these paper documents.

When an advertiser places an order with the station, a sales representative enters a sales order into the sales system 101. The sales representative then contacts the traffic department to ensure enough inventory is available to fulfill the order. A user in the traffic department confirms the available inventory using the traffic system 102. The user then informs the sales representative who then finalizes the order in the sales system 101 and enters all relevant information such as the type of billing (e.g. PI or specific dollar amount), frequency, and day part.

The sales representative prints out the sales order and delivers it to the traffic department. In the alternative, some sales systems 101 offer a data export to the traffic system 102 directly using a standard file format. However, not all sales systems 101 and traffic systems 102 support or interpret the standard equally. Oftentimes, some required data in the sales order will not be transferred from the sales system 101 to the traffic system 102 and will need to be reentered into the traffic system 102 by a user.

Once the traffic department receives the sales order, a user schedules the ad via the traffic system 102. The ad can be shown multiple times per week and during different day parts based upon the advertiser's preferences specified in the sales order. Most traffic systems require the user to manually schedule each occurrence of an ad during each commercial break. The user must account for certain rules, such as the requirement that an ad not be shown with less than 15 minutes of separation between each occurrence. Typically, a user will be warned multiple times by the traffic system 102 that there is a conflict with another ad or that a rule, such as 15-minute separation has been broken. The user will then need to resolve the conflict(s) before the traffic system 102 will allow the schedule to be saved.

The other primary function of the traffic system 102 is to receive and process the actual ads received from advertisers as well as programming content received from content producers or produced in-house at the station. Historically, these were provided on video tapes, and are typically stored on digital media such as DVD's or sent electronically via satellite or the Internet.

When an advertiser selects a station to air the ad, the advertiser sends a request to a third-party commonly known as a dub house. This request often includes instructions to overlay a toll-free telephone number onto the bottom portion of the ad. The telephone number is usually unique within the geographic region where the station resides. This facilitates tracking performance of an ad on a per-station basis when viewers make inquiries at a call center. The call center then reports to the advertiser how many inquiries were made. If a client has made a PI agreement with the station, then the client is responsible to report the number of inquiries to the station.

At the end of each business day, the user finalizes the next broadcast day's schedule in the traffic system 102. There can be no further changes to the schedule, and any unsold inventory for that day cannot be sold after the schedule is finalized.

The user then exports the schedule from the traffic system 102 to the automation system 103. The export uses a standard file format such as the Broadcast eXchange Format (BXF). The traffic system 102 and the automation system 103 must each interpret the file format standard equally to ensure proper playback for the broadcast. Furthermore, there is no mechanism to allow the automation system 103 to send any data back to the traffic system 102. This is significant in that the traffic system has no method of determining whether an ad or other video clip has been played at the proper time. Therefore, an advertiser has no way of knowing if their advertising is reaching the intended audience or not.

The automation system 103 is responsible for the actual playback automation of the video clips which include ads and programs such as television series and news programs The automation system 103 typically retrieves the video content from a content storage system provided by a third-party company. Often, these systems provide content via satellite for syndicated programs and other types of pre-recorded daily programs.

A user at the automation system 103 watches the video output on a television or monitor and uses buttons on the console of the automation system 103 to switch between live feeds and scheduled programming.

The video output is streamed by the automation system 103 to the broadcast tower 104 to be sent over the air waves to televisions in the local market. Since the switchover to HDTV by television stations, the data is a digital stream in MPEG-2 or MPEG-4 format.

To facilitate the accounting operations of the station, a user in the traffic department generates reports in the traffic system 102 and exports the resulting data into the accounting system 105. As in the case of the previously mentioned systems, there is a lack of integration between the traffic system 102 and the accounting system 105.

The lack of integration between systems results in the inability to accurately track when ads do not air when scheduled. When discrepancies are caught, the accounting department must work with the traffic and sales departments to ensure the client's account is properly credited to reflect the missing ad or a make good is scheduled to reconcile the discrepancy.

The other main disadvantage to non-integrated systems is the inability to sell advertising based upon anything but the combination of day part, frequency, and rate. For example, digital technology allows the display of snipes during television programs. However, the sales systems currently available in the marketplace are not capable of selling those types of advertisements. Stations have had to develop creative workarounds for these shortcomings with the end result being difficulty reconciling differences encountered between the sales system 101 and the accounting system 105.

4. The Present Invention

FIG. 2 is a simplified block diagram illustrating the present invention in use at a television or radio station. The integrated broadcast system 200 includes a sales module 201, a traffic module 202, an automation module 203, an accounting module 204, a database 205, and a content storage module 206. These modules are part of an integrated system that utilizes a common database 205. The exact method of linking modules together is not within the scope of the present invention. However, a common method within the preferred embodiment is to compile these modules as separate object classes and link them together into one executable using the compiler's linker.

The integrated broadcast system 200 can be used to broadcast content over air waves by television and radio stations, over the Internet by web sites, over mobile telephone networks to mobile phones, to other outlets such as highway billboards, or by other media outlets that may be invented in the future. However, the present disclosure focuses on the preferred embodiment in use at television and radio stations for simplicity. The concepts will remain the same between different types of media outlets.

Each module 201-204 of the integrated broadcast system 200 contains a graphical user interface with which a user operates the module 201-204. The preferred embodiment utilizes a World Wide Web interface comprising technologies such as HTML, CSS, and JavaScript although any human-computer interface can be used.

4.1 Sales

The entire process begins with the sales module 201. A client contacts a station's sales representative to place an order for an advertisement. The order can also be sent by the client electronically to avoid manual data entry using a standard file format such as Proposal XML. The client sends the order manually, and the sales module 201 displays the order for review by the sales representative before it is saved. Alternatively, a completely automated order may arrive electronically, which will be covered later in the present disclosure.

A user (usually the sales representative) then enters the sales order into the sales module 201. The user enters information for the ad such as whether the client is to be charged a flat rate each time an ad is shown vs. PI, where the amount entered will be multiplied by the number of inquiries reported by the call center the next day.

The user can choose to enter the order using the industry-standard method of day part and frequency. The present invention introduces new metrics that can be chosen for an order. For example, rather than a day part, a user can select a combination of viewer demographics such as age, gender, and income level. Then, the ad will be shown during programs which are targeted towards those viewers.

An ad can be shown until a certain number of viewers have seen the ad instead of specifying an ending date. The number of viewers can be an estimate based upon the average ratings the station receives or an actual number of viewers in the case of other media outlets that are measurable such as cable TV and the Internet.

The sales module 201 can also charge a client based on performance metrics such as an amount per thousand viewers, also known as CPM. Then, the ad can be shown for a specified period of time, after which the client is billed for the number of viewers who viewed the ad.

Other metrics and demographics parameters can be included or added to the sales module 201 that may be desired by the station. This flexibility offers the station the ability to adapt with changes by other media outlets and to synchronize billing and sales methods across outlets. Clients can then receive one bill for ads that run on multiple media outlets.

Upon saving the sales order, the sales module 201 checks the database 205 to ensure enough inventory exists to fulfill the order and alerts the user if not. If enough inventory exists, the order is created in the database 205. The sales module 201 then sends a request to the traffic module 202 to schedule the ad at the appropriate times. Thus, the ad is auto-filled into the schedule with no user intervention required.

If an order is revised, it is rescheduled as necessary by the traffic module 202. The revision triggers a notification to the client and other parties as necessary. When the revision is saved, the sales module 201 notifies the traffic module 202 and the accounting module 204. Each of these modules is responsible to act accordingly if necessary. For example, the traffic module 202 may need to reschedule an ad, or the accounting module 204 may need to adjust an invoice for an ad that has already run.

A sales order can be for a traditional type of ad such as a 30-second commercial, or any other type of ad such as a snipe. Snipes traditionally contain content promoting the next television program or a news item. The present invention introduces the ability to insert commercial advertising content into snipes.

A snipe can be used to combat the increasing use of Digital Video Recorders (DVR's) in use by viewers. A DVR gives the viewer the ability to skip traditional television commercials. However, snipes cannot be removed by today's DVR's. Future generations of DVR's may be able to block out some snipes. To prevent this, the automation module 203 can vary the location of the snipe on the video, thus decreasing the effectiveness of simply blocking out a specific portion of a video such as the bottom of the screen.

Every parameter of the sales module 201 is customizable per station. For example, the option to bill clients in advance of airing an ad, the length of separation between airings of a particular ad, and the types of demographics supported can all be tailored to suit the station's business requirements.

4.2 Traffic

The traffic module 202 manages scheduling information as well as program and advertising content. The scheduling information is stored in the database 205. The content is stored in the content storage module 206. The content storage module 206 can be any combination of physical hard disk drives, network storage, distributed filesystems, or any other type of data storage. In the preferred embodiment, the content storage module 206 contains several terabytes of capacity to facilitate the storage of several thousand hours of HDTV video.

Either before or after a sales order is entered into the sales module 201, a user can upload an ad via the traffic module 202. The ad can take the form of any file format such as an MPEG video, an Adobe Flash video, an audio file, or an image file. Any standard commercially-available software package can be used to create the ad, whether it is a television commercial, a snipe, or any other type of ad.

During the upload process, the user can enter meta-data for the ad including basic information such as its title and description. In addition, the user can enter its unique identifying information such as its Ad-ID or ISCI Code.

The present invention introduces an alternative identifier called a Media ID. A Media ID consists of a prefix such as a 4-letter code and a variable-length suffix containing information unique to an ad. Media ID's can also be used to identify television programs or any other type of content. Media ID's can be created by advertisers using their own unique prefix. An ad can then be located using its Media ID.

If an ad is designed to use a unique point of contact such as a toll-free telephone number, the traffic module 202 can automatically assign a number that is unique to a local geographic area. This eliminates the need for a user to manually assign and maintain a list of numbers across multiple media outlets. Other information such as an Internet URL or a street address can be added as well in accordance with client's requirements.

When a user maintains the programming schedule, the traffic module 202 allows the user to select individual programs or ads and drag and drop them into the desired timeslot using a graphical user interface such as a World Wide Web site. Each time the schedule is modified, the traffic module 202 automatically auto-fills the commercial breaks with the appropriate ads based upon existing orders.

Available inventory can vary based upon the arrangement of the commercial breaks from program to program. Due to the fact that the schedule is stored in the common database 205, the sales module 201 is able to accurately display the avails to the user of the sales module 201. The sales module 201 can also be configured to notify users such as sales representatives when available inventory changes.

Snipes are auto-filled by the traffic module 202 as well. Snipes typically do not appear during other ads and are limited to appearing during programming content. A user can specify the times snipes are allowed to display as well as their location on the video. The traffic module 202 allows this to be configured per program, for a group of programs, or for all programs to facilitate mass updates to policy.

The traffic module 202 is designed to be completely automated but also allows the user to override every parameter or manually schedule individual ads within a commercial break. Due to the varying requirements between advertisers and stations, the entire system 200 allows for overrides at all levels.

To allow for quick scheduling of programs, the traffic module 202 contains options for repeating programs over long time periods. For example, a user can schedule a television series to run every Thursday night at 7:00 PM rather than requiring the user to recreate the same schedule every Thursday. The traffic module 202 also offers the ability to repeat the series without selecting each episode up front. The user can then schedule individual episodes or a sequence of episodes at a later time.

The traffic module 202 allows for retransmitting network feeds as well as locally-stored content. A network feed can be scheduled ahead of time or switched on at unscheduled times such as during breaking news.

The present invention introduces a new method of networking stations together called sub-networks. A primary station's schedule can be shared with secondary stations. The secondary station can then override the primary station's schedule and broadcast its own scheduled content such as programs or local ads.

For example, WFAA and KDAF are television stations in Dallas, Tex. KDAF can be configured as a secondary station and broadcast all of WFAA's programming content except for morning programs and commercials. This allows for stations to serve multiple geographic markets without the need to duplicate schedules manually.

The main advantage to having the traffic module writing to a common database 205 is that both ads and programs can be scheduled at the last minute. For example, an ad can be scheduled to play immediately after the ad that is currently being broadcast. The automation module 203 will only load the next scheduled ad shortly before the current ad is finished playing. This opens up new inventory that was unavailable prior to the present invention.

4.3 Automation

The automation module 203, commonly-known as playback automation, generates the final video content that will be broadcast to viewers via the broadcast tower 207. In the case of other types of media outlets, another component would be used in place of the broadcast tower 207. For example, an Internet web site might use a router to distribute the video stream via the multicast UDP protocol.

The automation module 203 reads scheduling information from the database 205 and determines which video file to play next. The automation module 203 opens the video file from the content storage module 206 and begins to read data from the file and insert the video and audio data into the broadcast stream. The source video file need not be in a particular format as the automation module 203 supports many types of video formats such as Adobe Flash, MPEG, and Microsoft AVI. The automation module 203 can convert multiple types of audio and video formats into the required output format, usually MPEG-2 or MPEG-4. This flexibility allows advertisers and content producers to deliver content in any common format without the need to purchase high-end video equipment.

A user can interact with the automation module 203 and switch between the scheduled pre-recorded programs and live feeds. The automation module 203 automatically adjusts the schedule to account for any extra time a live feed may be active past the scheduled time. For example, if a live feed airs for 5 seconds longer than scheduled, then upon switching back to the scheduled programming, each video clip will play 5 seconds later than scheduled. An ad scheduled to air at 5:03:00 PM would be aired at 5:03:05 PM.

The user can control the automation module 203 to skip ads or other video clips in order to catch up if needed. In this case, the automation module 203 will not mark such an ad as aired, and the client will not be billed for that airing. If the client has prepaid for the ad, they will have a credit on their account.

The automation module 203 reads a snipe from a file on the content storage module 206 and overlays the snipe onto the final video output. Snipes can be scheduled at specific times or intervals within a program as desired by the client. Content producers can also specify rules for snipes that are overlaid onto their programs. For example, producers may wish to restrict how often a snipe may appear or the location of the video screen allowed for snipes.

The automation module 203 reads the schedule from the database 205 to determine when a snipe should appear, where it should appear on the video screen, how long it should appear, and any special animations such as transitions that may be required. The duration of the snipe can be automatically determined based upon its video file duration or by user input.

A snipe can take many forms including a single image or a video clip. Snipes can include audio although the use of audio should be used infrequently to minimize any negative impact upon the featured program content. The dimensions of a snipe should be the same or less than a typical television station logo watermark that typically appears in the lower right corner of most television channels. The entire bottom third of a screen can be used for a snipe as well. In any case, care should be taken so as to avoid covering any vital portions of a program's content such as subtitles.

As with normal program content, the automation module 203 supports many types of image formats such as PNG, JPEG, and GIF as well as video formats such as Adobe Flash, MPEG, and Microsoft AVI. The resolution of both snipes and regular program content should be higher than or equal to the station's output video resolution for maximum clarity.

A snipe is typically overlaid onto the output video by the automation module 203 using a technique commonly-known as alpha blending. This allows the snipe to have transparent sections rather than appear to be rectangular or square in shape. Other compositing methods can be used to achieve different effects for the end result.

The automation module 203 also simplifies the distribution and storage of content by automatically overlaying the selected telephone number or other information onto an ad when it is broadcast. Thus, the client is no longer required to send a unique version of an ad to each station. All stations can receive the same exact content with a blank area suitable for insertion of the unique information.

The automation module 203 then sends the final video stream to the broadcast tower 207. The stream is typically sent to the broadcast tower 207 using the SMPTE ST 310:2010 standard. The broadcast tower 207 then broadcasts the data over the air on the frequency allocated to the station.

4.4 Accounting

The accounting module 204 handles all of the accounting and billing functions of a station or other type of media outlet. The integrated system 200 ensures that all billing is completely accurate in cases where an ad does not air as scheduled or a modification is made after the order is finalized.

The accounting module 204 can generate invoices daily, weekly, or at the end of any other billing cycle. Invoices that are generated after an ad was scheduled to air accurately reflect cases where ads did not air at their scheduled times. The accounting module 204 automatically adjusts the billed amount accordingly.

A user can override the accounting module 204 and adjust an invoice or a client's account manually as well. A user can also provide discounts, set payment terms, and other accounting functions as necessary.

An invoice can be automatically emailed to the client or sent via other methods. The electronic invoice includes a link to an Internet URL where the client can view the invoice, make payments, view their account balance, or send a message to the station. The invoice can also be sent directly to the client's accounting system to eliminate the need for manual data entry.

Payments can be received from clients via traditional methods such as paper check or new methods such as Automated clearinghouse (ACH) payments. The accounting module 204 can be configured to automatically debit a client's bank account when payment is due.

The accounting module 204 can also export any financial data to a station's third-party accounting package. This allows the station to maintain all of their accounting information and other financial operations such as payroll in one system. A station may also import the data from the accounting module 204 into a third-party business intelligence system for enhanced reporting.

The accounting module 204 also notifies a user of the sales module 201 when a make good is necessary for clients who prepay for advertising. The sales module 201 then displays a list of ads that did not air to the user. Once a make good is entered into the sales module 201, the accounting module 204 is notified to reflect the adjustments on the next invoice.

4.5 Media Network

FIG. 3 is a simplified block diagram illustrating communications between a media network 300, multiple advertising clients 301a,b, and multiple media outlets 200a-d. In the preferred embodiment, the media outlet 300 is a World Wide Web site, although any other computerized system can be used. The media outlets 200a-d can be television stations, radio stations, World Wide Web sites, or any other media outlet employing the use of the integrated system 200. The number of clients 301a,b and media outlets 200a-d will be numerous and is not limited to only a small quantity. However, there will only be one media network 300 at all times.

The primary purpose of the media network 300 is to manage media buys for clients 301a,b across multiple media outlets 200a-d. A client 301a,b sends a request to the media network 300 for a list of avails and rates matching the desired demographics, rates, etc. from media outlets 200a-d worldwide. Upon selecting the desired avails, the client 301a,b sends an order via the media network 300 to each selected media outlet 200a-d. The order is then processed automatically by the media outlet 200a-d by the sales module 201 in use at each media outlet 200a-d.

A client 301a,b can also request a list of last-minute avails that one or more media outlets 200a-d may want to sell at a reduced rate rather than have unsold inventory. The media network 300 can select avails automatically using a client's 301a,b criteria or simply display the list of matching avails to the client 301a,b for manual selection.

A client 301a,b and/or a media outlet 200a-d may wish to enter into negotiations over rate or other parameters for an avail or group of avails. The client 301a,b or media outlet 200a-d sends a request to the media network 300 to initiate a negotiation with the other party. The media network 300 then acts as a mediator between the client 301a,b and the media outlet 200a-d. When both parties are satisfied with the negotiated parameters, the media network 300 sends an order to the media outlet 200a-d with the negotiated rate and other parameters.

The second primary purpose of the media network 300 is to consolidate programming schedules between media outlets 200a-d and to republish those schedules as needed. Each media outlet 200a-d sends its schedule updates to the media network 300 at a preconfigured interval such as 24 hours. The media network 300 may also request updates on-demand from a media outlet 200a-d. Typically, only changes to the schedule from the last update will be sent in order to conserve resources, although the entire schedule for a block of time may be sent.

The media network may publish this scheduling information to other parties and/or make the schedules available via an Application Programming Interface such as a web service. Services such as those offered by Schedules Direct and other companies rely upon data gathered from multiple sources and are often inaccurate or out-of-date by the time they are received by their customers. In the present invention, the schedules are many times more accurate due to the consolidation of the scheduling data into one system such as the media network 300.

The third primary purpose of the media network 300 is to distribute both programming and advertising content to multiple media outlets 200a-d simultaneously. When a client 301a,b uploads or otherwise sends a new ad to the media network 300, it is automatically distributed to all media outlets 200a-d scheduled to air the ad. Programming content is distributed to all media outlets 200a-d scheduled to air the program in the same manner.

In the preferred embodiment, content is distributed over the multicast UDP protocol or via other methods such as a satellite link to multiple media outlets 200a-d. Multicast UDP allows the media outlet 200a-d to send the data one time and conserve network bandwidth. Any transmission errors such as dropped packets or corrupted data can be recovered by the media outlets 200a-d by requesting retransmission of the missing parts from the media network 300. The media network 300 then gathers a list of data segments that need to be retransmitted and retransmits them over multicast UDP until all media outlets 200a-d have received the complete file.

FIG. 4 is a flow diagram illustrating a method 400 for allocating unique contact information to an ad, according to the preferred embodiment. A media outlet 200a-d requests this unique information from the media network 300 for ads that require unique contact information such as a toll-free telephone number. In 401, the media network 300 determines which media outlets 200a-d are within conflicting range of the requesting media outlet 200a-d. The conflicting range will vary between media outlets 200a-d of differing types as well as between media outlets 200a-d of the same type.

For example, in the preferred embodiment, a group of television stations will broadcast at varying signal strengths, and the signal range will vary depending upon the strength, surrounding terrain and broadcast tower height. The media network 300 maintains this signal information along with the latitude and longitude of the towers. Using this information, terrestrial radio frequency path analysis software such as SPLAT! can be used to calculate exactly where each broadcast signal will reach. The resulting information is then used to determine which stations overlap and therefore need different points of contact.

In the case of media outlets 200a-d which broadcast over the Internet or other media which cannot be mapped to physical locations, each media outlet 200a-d must have its own unique point of contact if the client 301a,b wishes to measure performance across these media outlets 200a-d.

In 402, the media network 300 searches for an unused point of contact that is available for the ad and is not used by any of the conflicting media outlets 200a-d. Preference is given to any point of contact that has already been used at other non-conflicting media outlets 200a-d. This ensures that only the absolute minimum number of points of contact will be allocated. Typically, a client will have more points of contact available than will actually be allocated to ads. The media network 300 maintains the list of points of contact and also creates new points of contact as necessary for clients that have not obtained their own.

In 403, the media network 300 assigns the point of contact to the ad and notifies the traffic module 202 at the media outlet 200a-d. This method is repeated as many times as necessary to allocate all points of contact to an ad (e.g. an ad that requires both a toll-free telephone number and a World Wide Web URL).

When a new media outlet 200a-d joins the media network 300, it may be necessary to reallocate some or all of the points of contact previously allocated according to the method 400. The present invention allows this to occur with minimal impact to all entities involved due to the dynamic overlaying of contact information onto ads by the automation module 203. Tracking inquiries is synchronized across all entities via the media network 300.

While the method 400 is primarily designed for points of contact such as telephone numbers and World Wide Web URL's, the method 400 can be used to allocate any type of unique information to an ad. For example, scannable barcodes such as Quick Response or QR codes can be allocated as well.

The method 400 can also be used by a traffic module 202 for allocating points of contact to an ad. In this instance, the traffic module 202 sends a request to the media network 300 to allocate the point of contact using the method 400.

In view of the wide variety of embodiments to which the principles of the invention can be applied, it should be understood that the illustrated embodiment is exemplary only, and should not be taken as limiting the scope of the present invention. For example, more or fewer elements or components may be used in the block diagrams In addition, the present invention can be practiced within other types of media outlets other than television and radio stations, such as Internet broadcasting companies, World Wide Web sites, mobile content distributors, and highway billboards.

I claim:

1. A method of linking broadcasting systems and advertising clients together via a communications network comprising the steps of:

managing media buys, using at least one computer with a processor and memory, for clients across multiple destination radio and/or television broadcasting systems starting from the time of purchase before invoices are generated by retrieving and maintaining programming schedules and lists of unfilled time-based broadcast slots available for programming and advertising content, receiving orders to fill said slots with advertisements and programming content, selecting said slots that meet the criteria of each order by searching for slots meeting the pricing criteria of each order and/or slots that are forecasted to generate the highest response rates, mediating the negotiation of rate and demographics and other parameters between users at clients and users of said radio and/or television broadcasting systems, and forwarding said orders to said radio and/or television broadcasting systems;

consolidating programming schedules, using at least one computer with a processor and memory, between radio and/or television broadcasting systems;

configuring said radio and/or television broadcasting systems to send their schedules, using at least one computer with a processor and memory, directly to other radio and/or television broadcasting systems;

republishing said schedules, using at least one computer with a processor and memory, to other parties;

distributing both pre-recorded programming and pre-recorded advertising content, using at least one computer with a processor and memory, to multiple radio and/or television broadcasting systems simultaneously to be broadcast at the scheduled times; and allocating unique point of contact information, using at least one computer with a processor and memory, to ads across multiple geographic locations.

2. The method of claim 1, wherein the managing of media buys includes the presentment of available time-based broadcast slots up to the last second before broadcast.

3. The method of claim 1, wherein the managing of media buys includes the option for a user at a client to negotiate pricing and other terms with a user at a media outlet.

4. The method of claim 1, wherein the programming and advertising content is distributed over the multicast User Datagram Protocol (UDP).

5. The method of claim 1, wherein the programming schedules are made available via an Application Programming Interface such as a web service.

* * * * *